United States Patent [19]

Kawaguchi et al.

[11] 3,971,204

[45] July 27, 1976

[54] CIRCUIT FOR DRIVING A DC MOTOR FOR A CLOCK

[76] Inventors: Norio Kawaguchi, No. 2-23-4-1202, Takashimadaira, Itabashi, Tokyo; Toshio Yaehashi, No. 3-4-13, Minami, Ichikawa, Chiba, both of Japan

[22] Filed: Jan. 13, 1975

[21] Appl. No.: 540,650

[30] Foreign Application Priority Data

Jan. 17, 1974 Japan .............................. 49-8487[U]

[52] U.S. Cl. .............................. 58/23 D; 58/23 BA; 318/85

[51] Int. Cl.[2] ........................ G04C 3/00; H02P 3/08

[58] Field of Search ................ 58/23 D, 23 R, 23 A, 58/23 BA; 318/85

[56] References Cited

UNITED STATES PATENTS

| | | | |
|---|---|---|---|
| 3,808,791 | 5/1974 | Hara | 58/23 D X |
| 3,830,052 | 8/1974 | Daniels et al. | 58/23 BA |

*Primary Examiner*—E. S. Jackmon

[57] ABSTRACT

A circuit for a clock having a time indicating mechanism is connected to regulate the driving of a DC motor by a predetermined amount at predetermined time intervals, so as to actuate the time indicating mechanism without being affected by the variation in the amplitude of the DC energizing voltage available for driving the motor and the variation in the load on the motor. The motor driving circuit has a timing pulse generating circuit for generating timing pulses at the predetermined time intervals, a holding circuit actuated by the timing pulse applied thereto by the timing pulse generating circuit so as to be self-held thus enabling the motor to be energized from the DC energizing voltage, and switching means, connected to the motor or the time indicating mechanism so as to be actuated when the motor is driven by the predetermined amount. The switching means is connected to the holding circuit, so that the holding circuit is deactivated to terminate the self-holding when the switching means is actuated upon completion of the driving of the motor by the predetermined amount, thereby also terminating the energization of the motor from the DC energizing voltage.

5 Claims, 2 Drawing Figures

CIRCUIT FOR DRIVING A DC MOTOR FOR A CLOCK

BACKGROUND OF THE INVENTION

The present invention relates to a circuit for intermittently driving a DC motor for a clock, wherein the motor is driven by a predetermined exact amount at predetermined time intervals by means of timing pulses, without being affected by the variation in the amplitude of the DC energizing voltage and the variation in the load on the motor, so that the accurate indication of the clock is insured regardless of the variation of the amplitude of the D.C. energizing voltage and the load on the motor.

Heretofore, an AC energizing voltage has been utilized in driving a rotary drum type clock having a plurality of time indicating flaps, each successively brought to the displaying position for indicating the time. An AC synchronous motor is driven directly by the AC energizing voltage, and the continuous rotation of the motor is converted into intermittent motion by means of a mechanical intermittent motion mechanism such as a Geneva gear mechanism or the like. However, such a continuous rotation of the motor has a disadvantage in that it requires a large consumption of the electric power for continuously driving the motor.

Thus, in order to avoid the above disadvantage, a rotary drum type clock has been developed, wherein a DC motor is intermittently driven at predetermined time intervals by a DC energizing voltage by using a timing pulse generating circuit for generating timing pulses at the predetermined time intervals, and the indication of the time is switched each time the DC motor is driven.

However, the timing pulse generating circuit usually comprises IC circuits including a quartz oscillator. The pulse amplitude is affected by the amplitude of the DC energizing voltage although the width and the cyclic period of the pulses are kept unchanged.

Since the DC motor is coupled with the time indicating mechanism of the clock through gearing means, the rotation of the DC motor and hence the rotation of the rotary drum of the clock are varied depending upon the variation in the electric power applied to the DC motor caused by the variation in the amplitude of the pulses even though the load of the motor (the load imposed by the time indicating mechanism) is kept constant, thereby deteriorating the accurate indication of the time.

This results in serious defects in the accurate operation of the clock when a battery of the nominal voltage of 1.5 volts, for example, is used to provide a DC energizing voltage ranging from 1.1 to 1.7 volts in order to most economically or effectively use the electric cell, together with the influence of the variation in the load on the motor resulting from the highest and the lowest load of the time indicating mechanism.

The present invention aims at avoiding the above described disadvantages of the prior art circuit for driving the motor for the clock.

SUMMARY OF THE INVENTION

The object of the present invention is to provide a novel and useful circuit for driving a DC motor for a clock which avoids the above described disadvantages of the prior art circuit for driving the motor for the clock and permits the motor to be driven exactly by a predetermined amount at predetermined time intervals without being affected by the variation in the energizing voltage and/or the variation in the load on the motor.

The above object is achieved in accordance with the present invention by the provision of a control circuit for intermittently driving a DC motor for a clock having a time indicating mechanism by a predetermined amount at predetermined time intervals so as to actuate the time indicating mechanism. The control circuit has a timing pulse generating circuit for generating timing pulses at the predetermined time intervals so as to actuate the control circuit, and means for applying a DC energizing voltage to drive the motor. The motor driving circuit is characterized by a holding circuit, connected at its input to the timing pulse generating circuit and at its output to the motor, the holding circuit being actuated to be self-held each time the timing pulse is applied thereto, thereby permitting the motor to be driven by the electric source. Switching means is connected to either of the motor and the time indicating mechanism so as to be actuated each time the motor is driven by the predetermined amount. The switching means is connected to the input of the holding circuit so as to release the self-holding thereof when the switching means is actuated whereby the motor is deenergized exactly at the completion of the driving thereof by the predetermined amount without being affected by the variation in the amplitude of the energizing voltage and the variation in the load on the motor.

With the circuit described above, the motor and hence the time indicating mechanism are actuated exactly at the predetermined time intervals to permit the accurate indication of the clock without being affected by the variation in the amplitude of the energizing voltage and the variation in the load on the motor while the power consumption is held to the minimum to permit the long life of an electric power source such as a battery.

DETAILED DESCRIPTION OF THE PREFERRED EMBODIMENT

Figure 1:
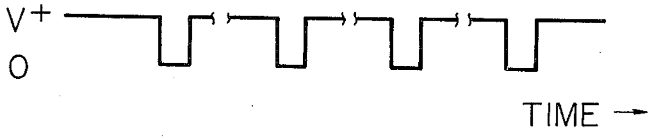
FIG. 1 is a diagram showing an example of the wave forms of the low level timing pulses used in the present invention.

Referring to FIG. 1, the wave forms of the low level timing pulses used in the present invention has the width of about 250 mS, for example, and the frequency or time intervals of about 1 min., for example.

Figure 2:
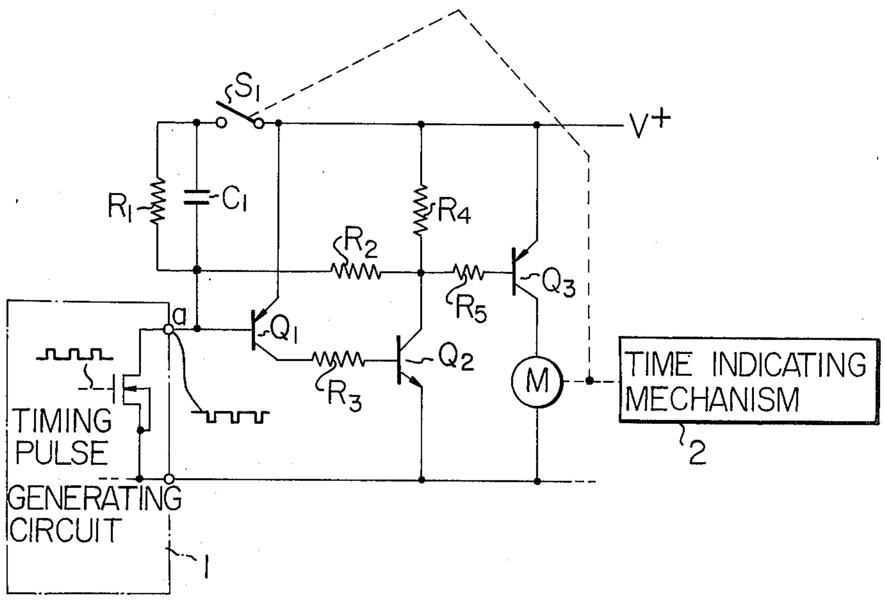
FIG. 2 is a diagram showing the electric circuit constructed in accordance with the present invention.

The low level timing pulses are generated at the output a of the timing pulse generating circuit 1 shown in FIG. 2. The timing pulse generating circuit 1 is shown as comprising only an N-type open drain element (N-type MOS transistor), but, in general, it comprises a quartz oscillator and is of a form of IC construction as a whole.

The electric circuit of the present invention shown in FIG. 2 comprises a PNP type transistor $Q_1$ having its base connected to the output a of the timing pulse generating circuit 1 and its emitter connected over a first conductor to the plus terminal $V^+$. To this terminal an energizing voltage is applied, for example, from a DC electric source such as a battery having the nominal voltage of 1.5 volts. An NPN-type transistor $Q_2$ has its base connected to the collector of the PNP-type transistor $Q_1$ through a current limiting resistor $R_3$ and its emitter connected over a second conductor to the minus terminal of the electric source. The collector of $Q_2$ is connected to the plus terminal $V^+$ of the electric source through a current limiting resistor $R_4$, a PNP type transistor $Q_3$ has its base connected to the collector of the NPN-type transistor $Q_2$ through a current limiting resistor $R_5$ and its emitter connected to the plus terminal $V^+$ of the electric source. The collector of the PNP-type transistor $Q_3$ is connected to one terminal of DC motor M, the other terminal of which is connected to the minus terminal of the electric source.

In accordance with the present invention, one end of a feed back resistor $R_2$ is connected to the collector of the NPN-type transistor $Q_2$ while the other end of the resistor $R_2$ is connected to the base of the PNP-type transistor $Q_1$ to which the output a of the timing pulse generating circuit 1 is also connected. Thus, the transistors $Q_1$ and $Q_2$ and the resistor $R_2$ form a holding circuit which is, as described later, actuated (transistors $Q_1$ and $Q_2$ being rendered conductive) so as to be self-held and supply electric current to the base of the NPN-type transistor $Q_3$. This renders $Q_3$ conductive so that the motor M is energized from the electric source once a low level timing pulse is applied from the timing pulse generating circuit 1 to the base of the transistor $Q_1$, and remains energized even after the timing pulse disappears.

The motor M is coupled with a time indicating mechanism 2 of a rotary drum type clock so that the time is indicated by the driving of the motor M.

In accordance with the present invention, one terminal of an ON-OFF switch $S_1$ is connected to the plus terminal $V^+$ of the electric source while the other terminal of the switch $S_1$ is connected to the base of the PNP-type transistor $Q_1$ through a capacitor $C_1$. A discharge resistor $R_1$ is connected in parallel with the capacitor $C_1$. The switch $S_1$ is mechanically or electronically coupled with the motor M or the time indicating mechanism 2 (in the drawing, the switch $S_1$ is shown as being coupled with the time indicating mechanism 2) so that the switch $S_1$ is closed when the motor M is driven by the predetermined amount required for switching the indication of the time indicating mechanism 2. Thus, the switch $S_1$, the capacitor $C_1$ and the resistor $R_1$ form a switching circuit for releasing the self-holding of the holding circuit comprising the transistors $Q_1$ and $Q_2$ and the resistor $R_2$, so that the motor M is deenergized when it is driven by the predetermined amount for switching the time indicating mechanism 2 as described below.

In operation, each time a low level timing pulse is applied to the base of the PNP-type transistor $Q_1$ from the output a of the timing pulse generating circuit 1, the transistor $Q_1$ is rendered conductive so that current is supplied to the base of the NPN-type transistor $Q_2$, thereby also rendering transistor $Q_2$ conductive and lowering its collector voltage. The low collector voltage is fed back to the base of the PNP-type transistor $Q_1$ through the feed back resistor $R_2$, thereby maintaining the transistors $Q_1$ and $Q_2$ in the conductive state even after the timing pulse from the output a disappears.

When the NPN-type transistor $Q_2$ is made conductive, the PNP-type transistor $Q_3$ is also rendered conductive so that the motor M is energized.

When motor M is rotated by the predetermined amount for switching the indication of the time indicating mechanism 2, the switch $S_1$ is closed so that the source voltage $V^+$ is instantaneously applied to the base of the PNP-type transistor $Q_1$ through the capacitor $C_1$. This renders the transistor $Q_1$ non-conductive so as to terminates the self-holding of the holding circuit, thereby returning the transistors $Q_1$ and $Q_2$ to their initial non-conductive state. Thus, the PNP-type transistor $Q_3$ is also rendered non-conductive to deenergize the motor M after it has been rotated the predetermined amount.

The value of the discharge resistor $R_1$ is usually so selected that it discharges the electric charge of the capacitor $C_1$ within the repetition period of the timing pulses, while it is sufficiently larger than the saturation resistances of the output elements so that the motor M may be easily started by the timing pulse applied to the base of the transistor $Q_1$ from the output a, even though the switch $S_1$ is held closed.

Once the motor M is driven, the switch $S_1$ is opened and remains open until the motor M has been rotated the predetermined amount to close the switch $S_1$.

When the next timing pulse is applied to the base of the N-type transistor $Q_1$, the above described steps are repeated.

When the duration of the timing pulse (i.e., the width of the inverted pulse) might become longer than the time in which the motor M is rotated by the predetermined amount for switching the time indicating mechanism 2, a differentiating circuit must be added between the output a of the timing pulse generating circuit 1 and the base of $Q_1$, to insure that one cycle of operation is positively carried out by the application of one timing pulse.

The holding circuit comprising the transistors $Q_1$ and $Q_2$ and the feed back resistor $R_2$ may be replaced by a silicon controlled rectifier element (SCR). In this case, the input signal is applied to the gate of the SCR, and a switch which is opened by the completion of the predetermined amount of rotation of the motor M is connected in the anode circuit of the SCR.

In accordance with the present invention, since the motor M is driven through the holding circuit which is self-held after the application of a timing pulse instead of directly driving the motor M by the timing pulse, and is stopped by the interruption of the holding circuit by the application of a detecting signal generated by the completion of the predetermined amount of rotation of the motor M, the accuracy of operation of the motor M is positively insured regardless of the variation in the amplitude of the energizing voltage and the variation in the load on the motor M while the consumption of electric power is kept to the minimum.

In the embodiment illustrated in the drawing, the transistors $Q_1$ and $Q_3$ are shown as being PNP-type transistors while the transistor $Q_2$ is shown as being a NPN-type transistor. However, in the present invention they may be replaced by other types of transistors, together with appropriate modification of the elements insofar as they achieve the results intended in the present invention.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A control circuit for a clock having a time indicating mechanism, which control circuit regulates the intermittent driving of a DC motor by a predetermined amount at predetermined time intervals so as to actuate said time indicating mechanism, said control circuit having a timing pulse generating circuit for generating timing pulses at said predetermined time intervals so as to actuate said control circuit and means for providing an energizing voltage for driving said motor, wherein the improvement comprises a holding circuit coupled at its input to said timing pulse generating circuit and at its output to said motor, said holding circuit being actuated to be self-held each time a timing pulse is applied thereto thereby enabling said motor to be driven by said energizing voltage, and switching means, coupled to said time indicating mechanism, so as to be actuated each time said motor is driven by said predetermined amount, said switching means being coupled to the input of said holding circuit so as to release the self-holding thereof when the switching means is actuated, whereby said motor is deenergized exactly at the completion of the driving thereof by said predetermined amount without being affected by the variation in the amplitude of said energizing voltage and the variation in the load on said motor.

2. A control circuit according to claim 1, wherein said timing pulse generating circuit generates low level timing pulses, said means for providing an energizing voltage includes a first conductor to which a plus potential is applied and a second conductor to which a minus potential is applied, and said holding circuit comprises a PNP-type transistor having is base coupled to said timing pulse generating circuit and its emitter coupled to the first conductor, an NPN-type transistor having its base coupled to the collector of said PNP-type transistor and its emitter coupled to the second conductor while the collector thereof is coupled to the first conductor, and a feed back resistor coupled between the collector of said NPN-type transistor and the base of said PNP-type transistor, the collector of said NPN-type transistor being coupled to said motor.

3. A control circuit according to claim 2, further comprising an additional PNP-type transistor having its emitter coupled to the first conductor and its collector coupled to one end of said motor, the other end of which is coupled to the second conductor, the base of said additional PNP-type transistor being coupled to the collector of said NPN-type transistor.

4. A control circuit according to claim 1, wherein said timing pulse generating circuit generates low level timing pulses, and said switching means comprises an ON-OFF switch coupled at its one terminal to the first conductor, a capacitor coupled at its one end to the other terminal of said ON-OFF switch and at its other end to the base of said first-mentioned PNP-type transistor, and a discharge resistor connected in parallel with said capacitor.

5. A control circuit for a clock having a time indicating mechanism, which control circuit regulates the intermittent driving of a DC motor by a predetermined amount at predetermined time intervals so as to actuate said time indicating mechanism, said control circuit having a timing pulse generating circuit for generating low level timing pulses at said predetermined time intervals so as to actuate said control circuit, and means, including first and second conductors, for providing a DC energizing voltage for driving said motor, with the potential on said first conductor being positive with respect to the potential on said second conductor, wherein the improvement comprises a first PNP-type transistor having its base coupled to the output of said timing pulse generating circuit and its emitter coupled to said first conductor, an NPN-type transistor having its base coupled to the collector of said first PNP-type transistor and its emitter coupled to the second conductor while the collector thereof is coupled to the first conductor, a feed back resistor coupled between the collector of said NPN-type transistor and the base of said first PNP-type transistor, a second PNP-type transistor having its base coupled to the collector of said NPN-type transistor and its emitter coupled to the first conductor while the collector thereof is coupled to one terminal of said motor, the other terminal of which is coupled to the second conductor, an ON-OFF switch having one terminal coupled to the first conductor, said ON-OFF switch being coupled to said time indicating mechanism so as to be closed each time said motor is driven by said predetermined amount, a capacitor coupled at its one end to the other terminal of said ON-OFF switch and at its other end to the base of said first PNP-type transistor, and a discharge resistor connected in parallel with said capacitor, so that said motor is driven each time a timing pulse is applied to said first PNP-type transistor and deenergized each time said motor is driven by said predetermined amount, without being affected by the variation in the amplitude of said energizing voltage and the variation in the load on said motor.

* * * * *